(12) United States Patent
Chen

(10) Patent No.: US 7,933,129 B2
(45) Date of Patent: Apr. 26, 2011

(54) ADJUSTABLE AUXILIARY EXPANSION CARD RETAINER

(75) Inventor: Ching-Hao Chen, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 12/068,851

(22) Filed: Feb. 12, 2008

(65) Prior Publication Data

US 2010/0232125 A1    Sep. 16, 2010

(30) Foreign Application Priority Data

Aug. 3, 2007   (TW) ............................. 96212817 U

(51) Int. Cl.
*H05K 7/14*    (2006.01)
(52) U.S. Cl. ......... 361/801; 361/732; 361/747; 361/759
(58) Field of Classification Search .................. 361/759, 361/801, 732, 740, 747, 726; 312/223.2, 312/223.3
See application file for complete search history.

(56) References Cited

U.S. PATENT DOCUMENTS

| | | | | |
|---|---|---|---|---|
| 6,442,037 B1 * | 8/2002 | Boe | ............................... | 361/759 |
| 6,885,565 B2 * | 4/2005 | Shi | ................................ | 361/801 |
| 6,970,363 B2 * | 11/2005 | Bassett et al. | ................. | 361/801 |

* cited by examiner

*Primary Examiner* — Dameon E Levi
*Assistant Examiner* — Sherman Ng

(57) ABSTRACT

An adjustable expansion card retainer comprises a first supporting frame and a second supporting frame with a front end thereof pivotally coupled to a rear end of the first supporting frame; a compressing end of the first supporting frame can be rotated to a proper angle relatively to a lower side of the second supporting frame. The compressing end of the first supporting frame is allowed to adjust downward amount movement substantially by sliding a first slide unit of the first supporting frame forward a proper distance relatively to a first fixing unit. Whereby, various expansion cards with different height can be respectively compressed to enable an auxiliary expansion card retainer to be suitable for fixing various expansion cards with different height.

13 Claims, 3 Drawing Sheets

ADJUSTABLE AUXILIARY EXPANSION CARD RETAINER

BACKGROUND OF THE INVENTION

1. Field of the Invention

The present invention relates to an expansion card retainer, and more particularly to an adjustable auxiliary expansion card retainer.

2. Description of Related Art

For enforcing the stability of an expansion card in a housing and preventing it from tripping during transportation, an auxiliary expansion card retainer will be mounted in the housing additionally to stabilize the expansion card to allow it not to trip from an expansion card slot besides a general expansion card retainer.

There are a variety of patents concerning auxiliary expansion card, for example, Taiwan Patent Publishing No. 200725224 discloses a supporting components for an outer expansion card; a surface of the supporting frame corresponding to the outer expansion card is provided with a clamping groove for clamping one side of the outer expansion card and one side of the supporting frame is projected with a locking fin fixed on a fixing frame locked on a housing of an electronic device thereby fixing one side of the outer expansion card on the housing of the electronic device. Besides, another side edge of the outer expansion card can be clamped by the clamping groove of the supporting frame.

Furthermore, Taiwan Patent No. 284934 discloses an auxiliary fixing apparatus for an expansion card used for helpingly fixing at least one expansion card in a housing. The expansion card comprises a first end and a second end, in which the first end is provided with a slip and fixed on a rear plate of the housing through a retainer set. The auxiliary fixing apparatus for an expansion card comprises a fixing frame mounted on the housing relatively to the rear plate and a buckling element, in which the fixing frame comprises a base wall on which at least on engagement groove capable of being engaged with the second end of the expansion card and the buckling element is rotationally assembled on the fixing frame. The buckling element is provided with at least one buckling arm and a propping part capable of pressing against the expansion card, in which the buckling arm can be engaged on the fixing frame.

Furthermore, U.S. Pat. No. 6,970,363 discloses an expansion card support mechanism; it comprises a tool-free chassis, an arm rotatably pivotally coupled to the chassis, in which the arm comprises an expansion card retention end a card retention end springably engageable against a peripheral portion of the expansion card.

As the height of each expansion card (e.g. PCI, ISA expansion card) is not exactly the same depending on the different factories, an auxiliary expansion retainer must have a different design or the change of length according to the difference of height. However, current general auxiliary expansion card retainers are all fixed length and fixed height such that the length thereof cannot be adjusted. Thus, a system might be attached with auxiliary expansion card retainers with different length; this not only increases the cost but also not exactly fit the customer's requirement.

SUMMARY OF THE INVENTION

For allowing an auxiliary expansion card retainer not only to have the expansion card stably compressing function but also to allow the adjustment to be done depending on the height of an expansion card, the present invention is proposed.

The main object of the present invention is to provide an adjustable auxiliary expansion card retainer, allowing the height thereof to be adjusted to fix an expansion card with different height.

Another object of the present invention is to provide an adjustable auxiliary expansion card retainer, allowing only one adjustable auxiliary expansion card retainer to be configured in one system and the requirement for fixing a variety of expansion cards with different height can be attained without needing to manufacture a variety of auxiliary expansion cards with different height to reduce the cost.

For attaining to the objects mentioned above, the present invention proposes a length-adjustable expansion card retainer comprising:

a first supporting frame, a front end thereof being provided with a compressing end used for helpingly compressing a periphery of an expansion card;

a second supporting frame, a front end thereof is coupled to a rear end of the first supporting frame to enable the compressing end of the first supporting frame to be inclined downward;

wherein, the first supporting frame comprises:

a first slide unit, a front end thereof is disposed with the compressing end; a first fixing unit, movably coupled to the first slide unit; a rear end of the first fixing unit is coupled to a front end of the second supporting frame;

a first positioning unit is coupled to the first slide unit and used for allowing the first slide unit and the first fixing unit to be fixedly coupled and not be slid relatively;

wherein, when the first slide unit is slid to and fro relatively to the first fixing unit, a length of the first supporting frame is provided with the adjustable function, and the length of the first supporting frame is fixed through the first positioning unit to allow amount of downward movement of the compressing end of the first supporting frame to be adjusted substantially so as to respectively compress various expansion cards with different height to enable one auxiliary expansion card retainer to be suitable for fixing various expansion cards with different height.

Wherein, the first slide unit is disposed with a first top plate and two first side plates; the two first side plate are respectively connected to lower ends of two sides of the first top plate; the first fixing unit is disposed with a second top plate and two second side plates; the two second side plates are respectively connected to lower ends of two sides of the second top plate; the two second side plates are positioned between the two first side plates.

Wherein, the first top plate is disposed with a first long slot; the first positioning unit is a screw; the screw is screwed in the first long slot; when a bottom of the screw is thrust against the second top plate tightly, the first slide unit is then not slid to and fro relatively to the first fixing unit.

Wherein, a rear end of the first supporting frame is pivotally coupled to a front end of the second supporting frame; a second positioning unit is coupled to the second supporting frame and used for allowing the first and the second supporting frame to be fixedly coupled and not to be rotated relatively.

Wherein, the second supporting frame comprises:

a second fixing unit and a second slide unit movably coupled to the second fixing unit;

wherein, the second positioning unit is coupled to the second fixing unit thereby allowing the second sliding unit is fixedly coupled to the second fixing unit and not to be slid relatively.

Wherein, the second fixing unit is disposed with a third top plate and two third side plates; the two third side plates are respectively connected to lower ends of two sides of the third top plate; the second slid unit is disposed with a fourth top plate and two fourth side plates; the two fourth side plates are respectively connected to lower ends of two sides of the fourth plate; the two fourth side plates are positioned between the two third side plates.

Wherein, a rear end of the first fixing unit is disposed with a first pivoting end; a front end of the second fixing unit is disposed with a second pivoting end; a front end of the second slide unit is disposed with a third pivoting end; the first pivoting end is positioned between the two third side plates; the first pivoting end is pivotally coupled to the second pivoting end through a first shaft; the first pivoting end is pivotally coupled to the third pivoting end through a second shaft; a pivoting position of the second pivoting end and the first pivoting end is in front of a pivoting position of the third pivoting end and the first pivoting end.

Wherein, the third top plate is disposed with a third long slot; the second positioning unit is a screw; the screw is crewed in the third long slot; when a bottom of the screw is thrust against the fourth top plate tightly, the second slide unit is then not allowed to slide to and fro relatively to the second fixing unit thereby causing the first and the second supporting frame to be fixedly coupled and not to be rotated relatively.

Wherein, the two first side plates are respectively disposed with a second long slot; front ends of the two second side plates are respectively disposed with a first pin; the two first pins are respectively movably positioned in the two second long slots.

Wherein, the two third side plates are respectively disposed with a fourth long slot; front ends of the two fourth side plates are respectively disposed with a second pin; the two second pins are respectively movably positioned in the two fourth long slots.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figures 1, 2:
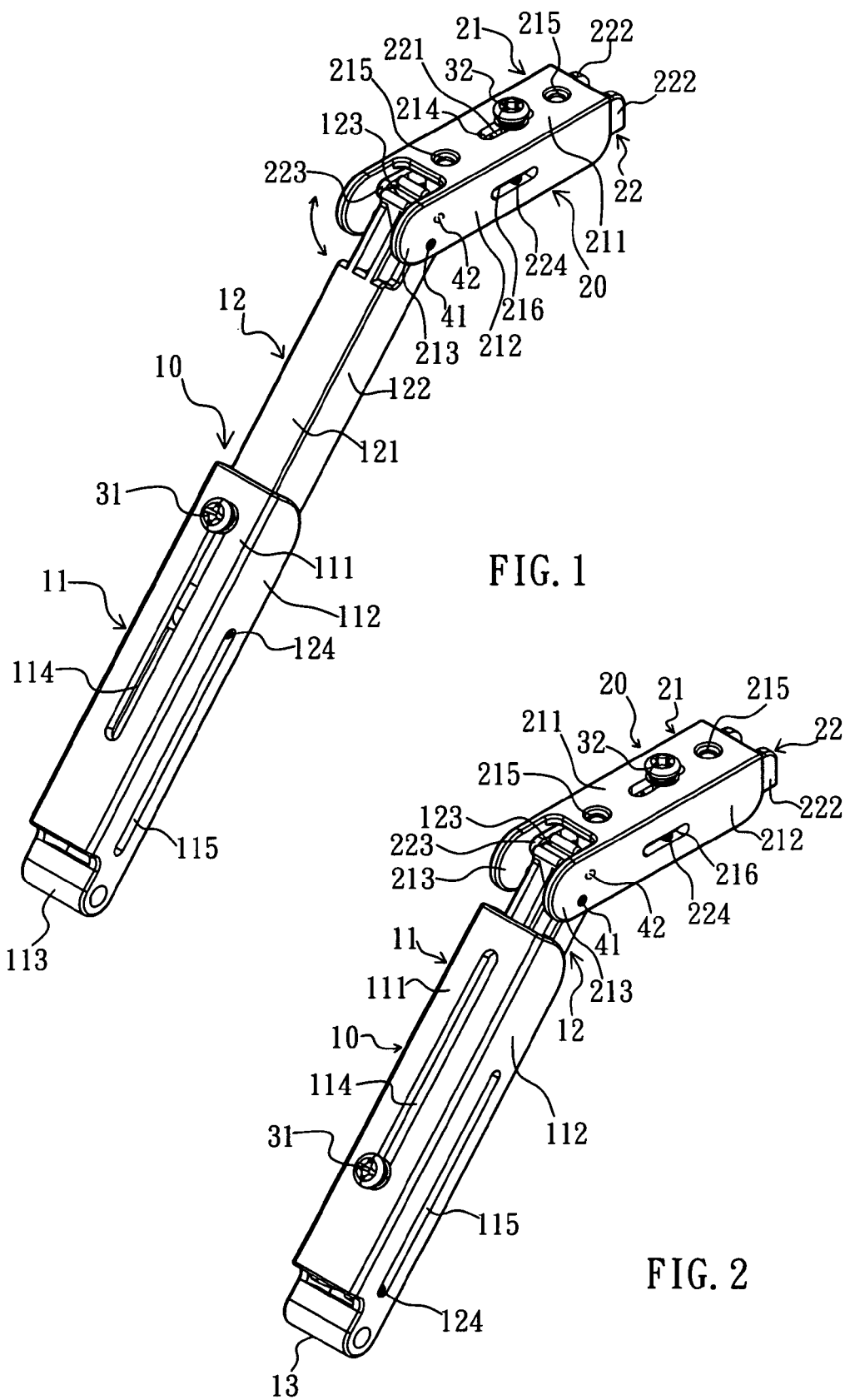
FIG. 1 is a perspective view of a first supporting frame in the longest state according to the present invention.
FIG. 2 is a perspective view of the first supporting frame in the shortest state according to the present invention.

Please refer to FIG. 1. An adjustable auxiliary expansion card retainer of the present invention is length adjustable, it comprises a first supporting frame 10 and a second supporting frame 20 pivotally coupled to the first supporting frame 10.

The first supporting frame 10 comprises a first slide unit 11 movably coupled to a first fixing unit 12; the first slide unit 11 is disposed with a first top plate 111, two first side plates 112 and a compressing end 113, the two first side plates 112 are respectively connected to lower ends of two side of the first top plate 111; the compressing end 113 is positioned at a front end of the first slide unit 11 and used for helpingly compress a periphery of an expansion card. The first top plate 111 is disposed with a first long slot 114; the two first side plates 112 are respectively disposed with a second long slot 115. The first fixing unit 12 is disposed with a second top plate 121, two second side plates 122 and a first pivoting end 123; the two side plates 122 are respectively connected to lower ends of two sides of the second top plate 121; the first pivoting end 123 is positioned at rear ends of the two second side plates 122; front ends of the two second side plates 122 are respectively disposed with a first pin 124; and the two second side plates 122 are positioned between the two first side plates 112; the two first pins 124 are respectively movably positioned in the two second long slots 115 and capable of being respectively slid to and fro in the two second long slots 115. A first positioning unit 31, e.g. screw, is engaged in the first long slot 114; if a bottom thereof is thrust against the second top plate 121 tightly, the first slide unit 11 cannot then be slid to and fro relatively to the first fixing unit 12.

The second supporting frame 20 comprises a second fixing unit 21 movably coupled to a second slide unit 22. The second fixing unit 21 is disposed with a third top plate 211, two third side plates 212 and a second pivoting end 213; the two third side plates 212 are respectively connected to lower ends of two side of the third top plate 211; the second pivoting end 213 is positioned in front of the second fixing unit 21 and pivotally coupled to the first pivoting end 23 through a first shaft 41; the third top plate 211 is provided with a third long slot 214 and at least one screw hole 215; the screw holes 215 are used for allowing the top plate 211 to be locked on a supporting frame connected to a housing of an electronic product through screws; the two third side plates 212 are respectively disposed with a fourth long slot 216. The second slid unit 22 is disposed with a fourth top plate 221, two fourth side plates 222 and a third pivoting end 223; the two fourth side plates 222 are respectively connected to lower ends of two sides of the fourth top plate 221; the fourth side plates 222 are respectively disposed with a second pin 224, the two fourth side plates 222 are positioned between the two third side plates 212; the two second pins 224 are respectively movably positioned in the four long slots 216 and capable of being respectively slid to an fro in the fourth long slots 216. A second positioning unit 32, e.g. screw, is engaged in the third long slot 214; if a bottom thereof is thrust against the fourth top plate 221, the second slide unit 22 can then not bee slid to and fro relatively to the second fixing unit 21.

The first pivoting end 123 is positioned between the third side plates 212 and further pivotally coupled to the third pivoting end 223 through a second shaft 42. A pivoting position of the second pivoting end 213 and the first pivoting end 123 is in front of the third pivoting end 223 and the first pivoting end 123. The first and the second supporting frames 10, 20 are allowed to pivotally couple to each other and a pivoting angle between the first and the second supporting frames 10, 20 can be adjusted through the first shaft 41. When the first fixing unit 12 takes the first shaft 41 as a center to rotate up and down relatively to the second fixing unit 21, the first pivoting end 123 can drive the second slide unit 22 to move rearward or forward; if the second positioning unit 32 causes the second slide unit 22 not to move forward or rearward, the pivoting angle between the first and the second supporting frames 10, 20 can then be fixed.

Figure 3:
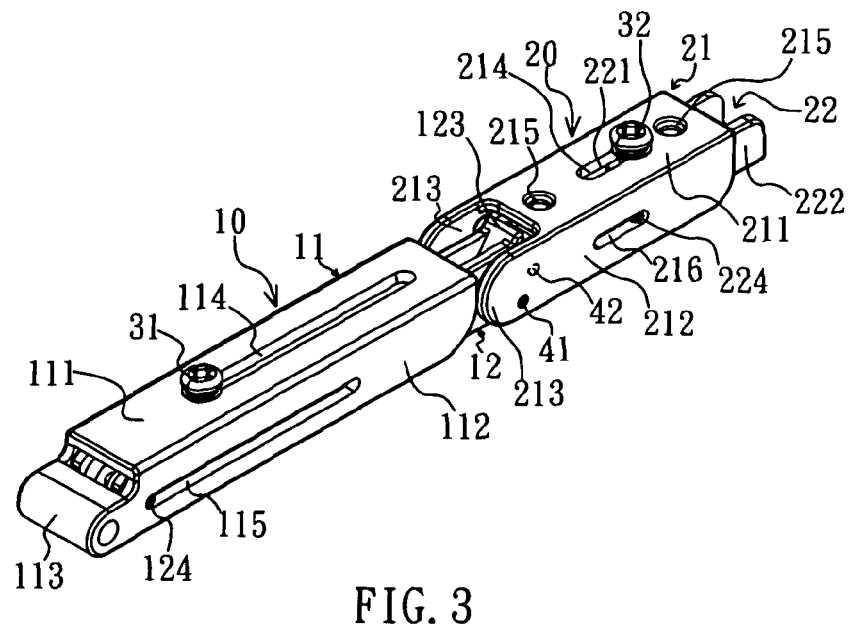
FIG. 3 is a perspective, view of the first supporting frame and a second supporting frame in a collected-together state according to the present invention.
Figure 4:
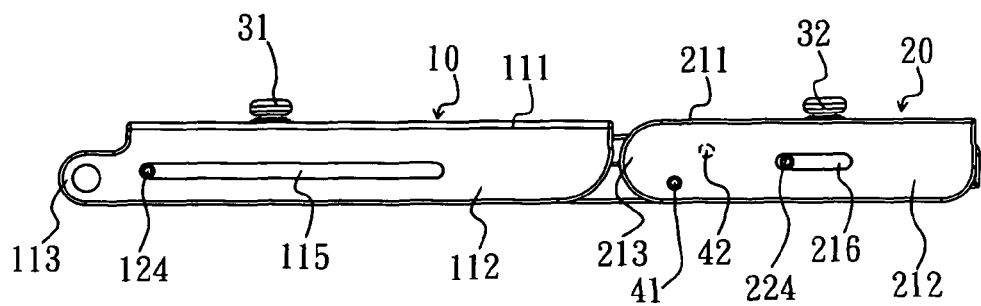
FIG. 4 is a lateral view of the first supporting frame and the second supporting frame in a collected-together state according to the present invention.
Figure 5:
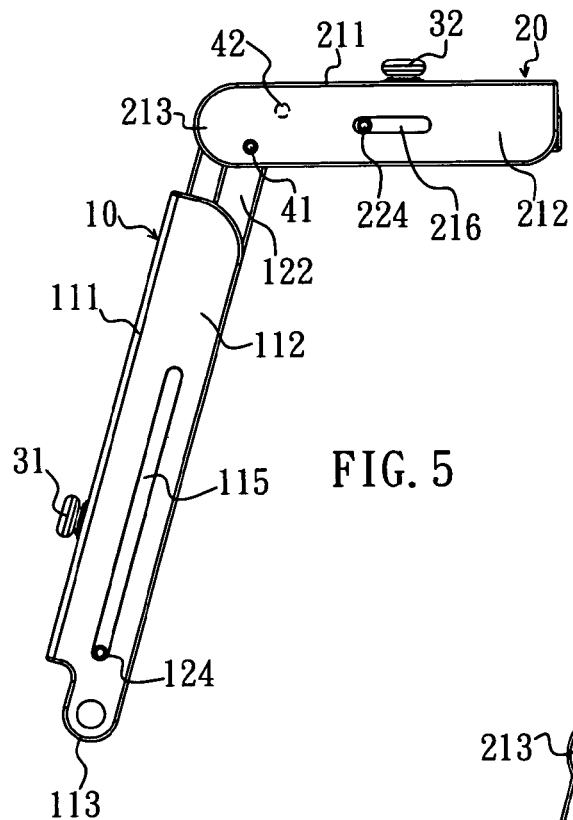
FIG. 5 is a lateral view of the first supporting frame in the shortest state according to the present invention.
Figure 6:
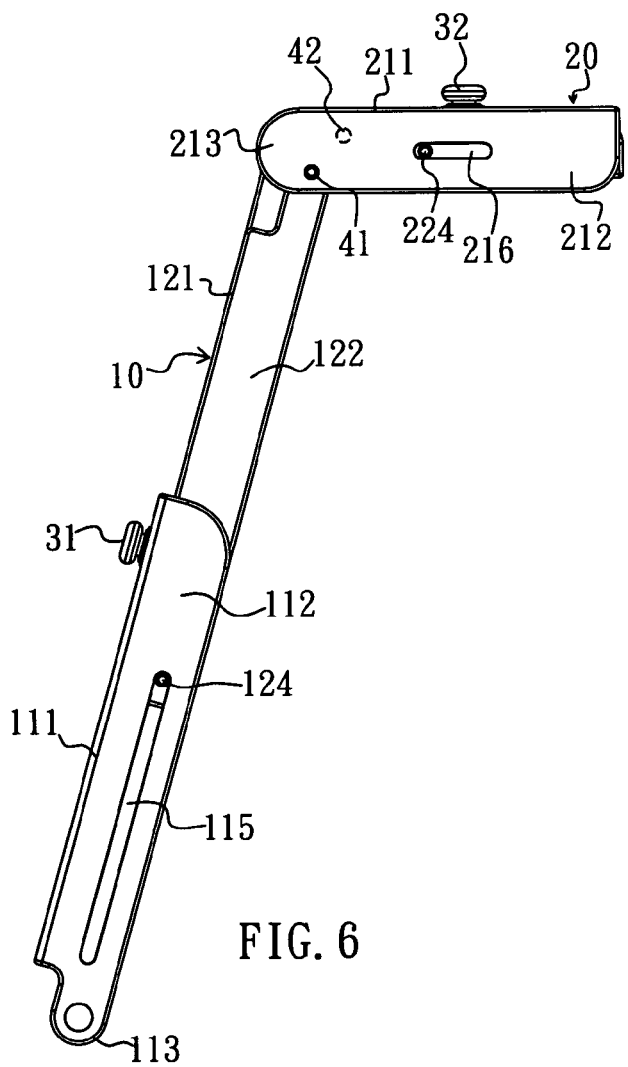
FIG. 6 is a lateral view of the first supporting frame in the longest state according to the present invention.

Please refer to FIGS. 1 to 6. According to the present invention, when the first and the second positioning units 31, 32 are loosen to cause them not to thrust the second and the fourth top plates 121, 122, the first and the second frames 10, 20 can then be movable and can be collected together to be in the shortest state as FIGS. 3 and 4 show. When the compressing end 113 of the first supporting frame 10 is caused to rotate an angle relatively to a lower side of the second supporting frame 20 and the second positioning unit 32 is locked tightly to thrust the fourth top plate 221 tightly, the compressing end 113 of the first supporting frame 10 can maintain a fixed angle relatively to the second supporting frame 20 as FIGS. 2 and 5 show so as to compress a higher expansion card. Thereafter, the first slide unit 11 is then pushed to slide downward and the first supporting frame 10 can then be pulled longer to cause the compressing end 113 of the first supporting frame 10 to be extended further downward as FIGS. 1 and 6 show to compress a shorter expansion card.

According to the present invention, the compressing end 113 of the first supporting frame 10 is rotated downward to a proper angle relatively to the second supporting frame 20 and the first slide unit 11 of the first supporting frame 10 is slid forward to a proper distance relatively to the first fixing unit 12 thereof to allow amount of movement of the compressing end 113 of the first supporting frame 10 to be adjusted substantially so as to respectively compress expansion cards with different height and allow an auxiliary expansion card retainer to be suitable for being used for fixing various expansion cards with different height. Therefore, only one adjustable auxiliary expansion card retainer needs to be mounted in one system, and the requirement for fixing various expansion cards with different height can then be matched; it is unnecessary to respectively manufacture a variety of auxiliary expansion card retainers with different length so that the cost can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An adjustable auxiliary expansion card retainer, capable of being length-adjusted, comprising:
   a first supporting frame, a front end thereof being disposed with a compressing end and used for helpingly compress a periphery of an expansion card; and
   a second supporting frame, a front end thereof being coupled to a rear end of said first supporting frame to allow said compressing end of said first supporting frame to be inclined downward;
   wherein, said first supporting frame comprises:
   a first slide unit, a front end thereof being disposed with said compressing end;
   a first fixing unit, movably coupled to said first slide unit; a rear end of said first fixing unit being coupled to a front end of said second supporting frame;
   a first positioning unit, coupled to said first slide unit and used for allowing said first slide unit to be fixedly coupled to said first fixing unit and not to be slid relatively to said first fixing unit;
   wherein, when said first slide unit is slid to and fro relatively to said first fixing unit, a length of said first supporting frame is provided with the length-adjustable function, and the length of said first supporting frame is fixed through said first positioning unit.

2. The adjustable auxiliary expansion card retainer according to claim 1, wherein said first slide unit is disposed with a first top plate and two first side plates; said two first side plates are respectively connected to lower ends of two sides of said first top plate; said first fixing unit is disposed with a second top plate and two second side plates; said two second side plates are respectively connected to lower ends of two sides of said second top plate; said two second side plates are positioned between said two first side plates.

3. The adjustable auxiliary expansion card retainer according to claim 2, wherein said first top plate is disposed with a first long slot; said first positioning unit is a screw; said screw is screwed in said first long slot; when a bottom of said screw is thrust against said second top plate tightly, said first slide unit is then not allowed to slide to and fro relatively to said first positioning unit.

4. The adjustable auxiliary expansion card retainer according to claim 3, wherein said two first side plates are respectively disposed with a second long slot; front ends of said two second side plates are respectively disposed with a first pin; said two first pins are movably positioned in said two second long slots.

5. The adjustable auxiliary expansion card retainer according to claim 3, wherein a rear end of said first supporting frame is pivotally coupled to a front end of said second supporting frame; a second positioning unit is coupled to said second supporting frame and used for allowing said first and said second supporting frames to be fixedly coupled to each other and not to be rotated relatively.

6. The adjustable auxiliary expansion card retainer according to claim 5, wherein said second supporting frame comprises:
   a second fixing unit;
   a second slide unit, movably coupled to said second fixing unit;
   wherein, said second positioning unit is coupled to said second fixing unit thereby allowing said second slide unit is fixedly coupled to said second fixing unit and not to be slid relatively.

7. The adjustable auxiliary expansion card retainer according to claim 6, wherein said second fixing unit is disposed with a third top plate and two third side plates; said two third side plates are respectively connected to lower ends of two sides of said third top plate; said second slide unit is disposed with a fourth top plate and two fourth side plates; said two fourth side plates are respectively connected to lower ends of two side of said fourth top plate; said two fourth side plates are positioned between said two third side plates.

8. The adjustable auxiliary expansion card retainer according to claim 7, wherein a rear end of said first fixing unit is disposed with a first pivoting end; a front end of said second fixing unit is disposed with a second pivoting end; a front end of said second slide unit is disposed with a third pivoting end; said first pivoting end is positioned between said two third side plates; said first pivoting end is pivotally coupled to said second pivoting end through a first shaft; said first pivoting end is pivotally coupled to said third pivoting end through a second shaft; a pivoting position of said second pivoting end and said first pivoting end is in front of said third pivoting end and said first pivoting end.

9. The adjustable auxiliary expansion card retainer according to claim 8, wherein said third top plate is disposed with a third long slot; said second positioning unit is a screw; said second positioning unit is screwed in said third long slot; when a bottom of said second positioning unit is thrust against said fourth top plate, said second slide unit is not then allowed to slide to and fro relatively to said second fixing unit thereby causing said first and said second supporting frames to be fixedly coupled to each other and not be rotated relatively.

10. The adjustable auxiliary expansion card retainer according to claim 9, wherein said two first side plates are respectively disposed with a second long slot; front ends of said two second side plates are respectively disposed with a first pin; said two first pins are respectively movably positioned in said two second long slots.

11. The adjustable auxiliary expansion card retainer according to claim 10, wherein said two third side plates are respectively disposed with a fourth long slot; said two fourth side plates are respectively disposed with a second pin; said two second pins are respectively movably positioned in said two fourth long slots.

12. The adjustable auxiliary expansion card retainer according to claim 1, wherein a rear end of said first supporting frame is pivotally coupled to a front end of said second supporting frame; a second positioning unit is coupled to said second supporting frame and used for allowing said first and said second supporting frames to be fixedly coupled to each other and not to be rotated relatively.

13. The adjustable auxiliary expansion card retainer according to claim 2, wherein a rear end of said first supporting frame is pivotally coupled to a front end of said second supporting frame; a second positioning unit is coupled to said second supporting frame and used for allowing said first and said second supporting frames to be fixedly coupled to each other and not to be rotated relatively.

* * * * *